Figure 1:
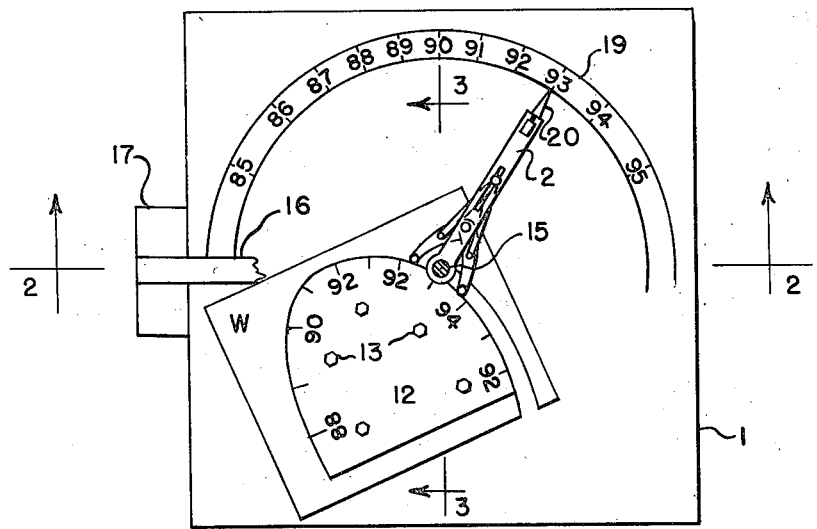

Oct. 31, 1944.  E. L. REED  2,361,565

BEVEL ANGLE INDICATOR

Filed March 4, 1944

Inventor
ELZA L. REED
By Reynolds & Beach
Attorney

Patented Oct. 31, 1944

2,361,565

UNITED STATES PATENT OFFICE 2,361,565

BEVEL ANGLE INDICATOR

Elza L. Reed, Seattle, Wash., assignor to Boeing Aircraft Company, Seattle, Wash., a corporation of Washington Application March 4, 1944, Serial No. 525,016

10 Claims. (Cl. 90—13.3)

My invention pertains to an indicator for milling machines, and in particular to such a device for indicating the angle at which a sheet edge is being beveled by such a machine.

One conventional type of milling or routing machine comprises a work table through which projects a side cutting milling tool. Immediately above this cutter is supported a cylindrical locating stub or roller. A template having a contour corresponding to the desired profile of the work plate is secured in parallel relation to the plate to be shaped, but spaced slightly from it. The work plate and template may be slid freely over the surface of the work table to engage the cutter.

In machining the work plate it is moved directly toward the milling cutter until the edge of the superposed template engages the locating stub or roller. The work sheet is then shifted to slide the edge of the template past the locator in contact with it. Simultaneously the cutter profiles the work sheet so that its finished outline conforms to the shape of the template.

If the work plate is of substantial thickness it is sometimes desired to cut its edge on a slight bevel, the degree of which may be different for different work, and may even vary for the same sheet from one portion of its contour to another. In fact, in some instances, it may be desired that one portion of the edge of the plate be exactly perpendicular to its faces, while other portions of the edge may be beveled. Such a composite cut may be made in its entirety by a cutter tilted slightly relative to the work table, perhaps four or five degrees.

It will be evident that if the milling cutter is inclined relative to the work table it may nevertheless still be used to machine a perpendicular edge, for the cutter axis will be inclined in only one vertical plane. If the sheet approaches the cutter in a direction perpendicular to such vertical plane, therefore, such plane thus being tangential to that portion of the template engaging the locator, the machined edge will be precisely perpendicular to the plane of the sheet. At the other extreme, if the work sheet is moved toward the cutter in a direction parallel to the vertical plane in which the cutter axis lies, so that such plane is disposed radially of the template curvature, the edge of the work sheet will be cut on a bevel equal to the degree of cutter tilt.

It follows, therefore, that if the work is moved toward the cutter in a direction between these extremes, so that the plane of the cutter axis perpendicular to the work table lies intermediate the positions radially and tangentially of the template portion engaging the locating element, the cutter will bevel the edge of the work sheet at an angle less than the tilt of the cutter in such plane. The degree of bevel will be directly related to the relationship between the cutter axis perpendicular plane and the template contour at its point of contact with the locating element. The more the template is swung away from the position in which such plane is tangent to the template edge and toward that in which the plane is disposed radially of it the greater will be the degree of bevel.

My invention is intended for use with a milling machine or router of the type described, which incorporates a cutter tilted relative to the work table, so that in cutting the contour of the work sheet it may be beveled to any desired degree within the capabilities of the machine. The problem is to indicate to the workman during the machining operation the degree of bevel at which the edge of the work sheet is being cut.

It is therefore a principal object of my invention to provide mechanism which will show at all times and with sufficient accuracy the degree of bevel being cut by a milling cutter in a machine of the type described above while the cutting operation is in progress and without interrupting it. Such object is accomplished by providing a bevel angle indicator controlled in accordance with the relationship between the portion of the template edge at the location of the routing cutter and the plane perpendicular to the work table in which the axis of such cutter lies.

A further object is to indicate this bevel angle reasonably accurately at all times despite variations in curvature of the template contour.

An additional object is to provide such a bevel angle indicator which will not prevent the relationship between the work sheet and the cutter being changed at will to alter the bevel angle without adjustment of the machine, but which will immediately indicate the new angle.

Another object is to devise an indicator of simple construction having the aforementioned capabilities, the use of which does not increase the work required to set up the job. Such indicator forms an integral part of the machine, and is operated automatically by manipulation of the work plate and template in the customary manner during the shaping operation.

The further objects of my invention best achieved by the particular type of indicating mechanism which I prefer, as described in detail hereafter, will be appreciated from the following discussion. It will be understood, however, that the various details of the particular device illustrated in the drawing and described may be altered within the scope of my invention as defined in the claims, if desirable for its application to particular types of machines, or to machines intended for special jobs.

Figure 1 is a plan view of a router embodying my bevel angle indicator, showing work supported on the work table and in the process of being machined by the router, parts being broken away.

Figures 2, 3:
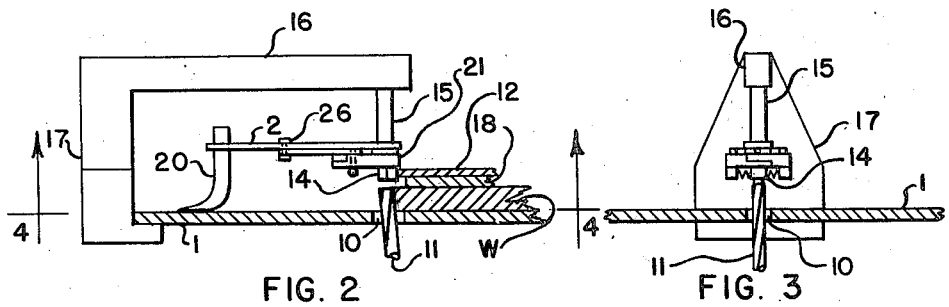

Figure 2 is a vertical section through the machine of Figure 1 taken on line 2—2 thereof, viewed in the direction of the arrows, but showing my indicator in a different position. Figure 3 is another vertical section through the machine taken perpendicular to the view of Figure 2, on the line 3—3 of Figure 1 looking in the direction of the arrows, and showing my indicator in the same position as in Figure 2.

Figure 4:
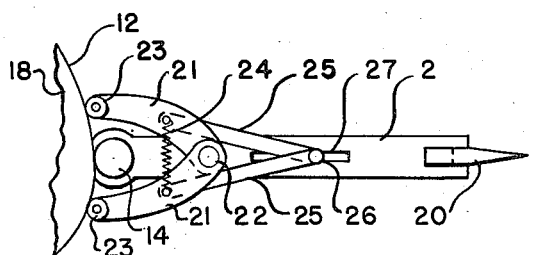

Figure 4 is a bottom plan view of my indicator on an enlarged scale, taken on line 4—4 of Figure 2.

A conventional type of milling machine or router which is well adapted for application of my indicator includes a work supporting table 1 having therein an aperture 10, through which a side milling cutter 11 projects upwardly from beneath the table. This cutter is, of course, rotated about an axis generally perpendicular to the table by drive mechanism located beneath it, which is not shown. This cutter, as seen best in Figure 2, is tilted somewhat relative to the work table so that its axis is inclined in a plane perpendicular to the table.

A work plate W to be shaped is laid flat upon the table 1, and may be moved universally over it into contact with the cutter 11. The profile to be given to the plate is determined by the shape of a template 12 secured to it in any suitable fashion, as by bolts 13. To locate the cut edge of the work plate W the edge of this template is pressed against a circular or cylindrical locating element 14, which may be a stub or a roller supported directly over the cutter 11 by a post 15 carried by a fixed arm 16 projecting laterally across the table 1 from a bracket 17 attached to the edge of the table. Because it is necessary to space the locator 14 slightly above the upper end of cutter 11, although the cutter must extend completely across the edge of the work plate W, a spacer plate 18 may be interposed between such plate and the template 12.

According to conventional practice the operator now moves the work sheet W directly toward the cutter 11 until the edge of the template 12 engages the locator 14. The work plate and template are then moved conjointly past the locator while the edge of the template is held in contact with it, so that the milling cutter cuts a groove in the work sheet the edge of which underlying the template will conform to the outline of the template.

If it is desired merely to form the work plate of a particular profile, corresponding to the shape of the template, the milling cutter 11 may be mounted perpendicular to the upper surface of the work table 1. When it is desired to bevel the edge of the work sheet, however, the cutter is tilted in the manner shown in Figure 2. If the bevel of the work plate edge is to be the same at all points the cutter may be inclined to a degree corresponding to the desired bevel, and the work sheet pressed toward the cutter in a direction parallel to the plane perpendicular to the table 1 in which the cutter is inclined, as shown in Figure 2. If a work piece requiring an edge bevel of different degree, or no edge bevel whatever, were moved similarly it would be necessary to readjust correspondingly the angle of the cutter relative to the table. Even such adjustment, however, does not solve the problem, for it may be desired to vary the degree of bevel from point to point on the same work sheet.

A representative example of a desired varying bevel is illustrated in Figure 1. The numerals on the template 12 indicate the angle at which the work sheet edge is to be beveled at various locations. Thus at the mark designated by the number 90 on the template the edge of the work sheet W should be perpendicular to its face. To one side of this mark, as indicated by the numerals 92, 92, 94, and 92, it is desired to cut a standing bevel, the inclination of which first increases and then decreases progressively away from the number 90 around the periphery of the plate. At the opposite side of the mark designated 90 an under bevel, progressively decreasing to 88 degrees, is to be cut. The numerals then, indicate in degrees the bevel angle between the edge of the work plate W and its top surface.

The edge of a plate can be cut with such a varying bevel by advancing it against a tilted milling cutter 11 at different angles, provided that the inclination of the cutter axis relative to the upper surface of the work table in a plane perpendicular to it exceeds the maximum desired angle of bevel, whether a standing bevel or an under bevel. The difficulty, however, is to maintain during the cutting operation the desired relationship between the cutter and the work sheet, so that the desired degree of bevel will be cut, and this is particularly difficult if the angle of bevel varies from place to place along the circumference of the sheet. Heretofore the only way of determining whether the bevel being cut was of proper degree has been to make a cut, then to remove the work sheet from contact with the cutter, and to test the cut edge with a suitable gauge.

By the use of my indicating mechanism the operator is able to determine the bevel angle of the work plate edge while the template 12 is in engagement with the locator 14 and the cutting operation is actually in progress.

My bevel angle indicator consists of an arm 2 which is supported by post 15, also carrying locating element 14, to swing about an axis perpendicular to table 1. The particular manner in which the arm is mounted is of little importance. It may, for example, be fixed rigidly on post 15, and the post itself may be swiveled in arm 16. On the other hand, the post may be mounted rigidly and arm 2 journaled upon the post. The swinging end of the arm carries a foot 20 having an indicating pointer which moves along a protractor arc 19 on the surface of work table 1 as the arm swings about post 15. The arc is graduated in degrees of bevel, as shown in Figure 1, so that if the line along which the work is moved toward the cutter is extended to intersect such arc the point of intersection will correspond to the angle of the bevel which will be cut in that instance by the cutter. It will be evident, thereofore, that, to indicate the bevel angle on arc 19, the direction of arm 2 must be coordinated with the movement of work sheet W toward the cutter.

When the work sheet W is advanced toward an inclined cutter 11, or the edge of template 12 is moved past locator 14 in engagement with it, the relationship between the tangent to the template at the point engaged with or moved toward the locator and the plane perpendicular to the work table in which the cutter axis lies determines the bevel angle cut. If the arm 2 is to be aligned to indicate on arc 19 such bevel angle, therefore, it must be positioned in a known relationship to such a tangent, preferably perpendicular or substantially so. A chord on template 12 subtending an arc the center of which contacts locator 14, through which point such tangent passes, will be parallel to such tangent if the arc is circular. Even if the curvature of the template changes progressively such chord and tangent will be substantially parallel, provided that such arc is reasonably short. The bevel angle will be indicated sufficiently accurately, therefore, if the arm 2 is disposed perpendicular to the chord of a short arc bisected by the point of contact of the template with locator 14.

In order to direct arm 2 in this manner two legs 21 are pivoted on it by a common pivot pin 22 located adjacent to the pivot axis of the arm, to dispose their swinging ends straddling locator element 14. A guide roller 23 is carried by each leg to engage the edge of template 12. As the template is advanced toward the locator its engagement with rollers 23 will swing the legs away from the locator.

Legs 21 will be swung farther apart by a template portion of gradual curvature than by one of sharp curvature, but tension spring 24, interconnecting the legs, will draw them toward each other again to bring follower rollers 23 into contact with a template edge portion of sharp curvature after they have been thus spread.

To control arm 2 it is not enough that locator 14 and both guide rollers 23 be in contact with the edge of template 12. A positive connection between such arm and the legs must be provided, and the swinging ends of legs 21 must be located approximately equidistantly on opopsite sides of locator 14. Substantially equal spacing of the legs from the locator is insured by links 25, connecting the legs to arm 2. A pivot 26 interconnecting the arm and both links 25 is mounted to slide along a slot 27 formed in the arm and aligned with it, to maintain guide rollers 23 always spaced approximately equidistantly from locator 14 and arm 2 perpendicular to a line joining such rollers. For every degree of template edge curvature, therefore, these rollers will contact it one at each end of a chord subtending an arc the center of which is engaged with locator 14. Any departure from a circular arc of the curve subtended by the chord intercept of rollers 23 will cause a slight deviation of arm 2 from precise perpendicularity to a tangent to the template curvature at the point of its engagement wtih locator 14. This discrepancy is caused, however, merely by the fact that such chord will not be exactly parallel to this tangent. The discrepancy in the great majority of template shapes will be so slight, however, as to be less than the inaccuracy resulting from manual manipulation of the template and work plate, and is therefore inconsequential.

The manner in which my indicator functions will now be readily understood. As the work plate W and template 12 are moved toward the cutter 11 guide rollers 23 will engage the edge of the template before it contacts locator 14. At this time the work has not been moved toward the cutter quite to the line of cut. Before advancing the template and work farther they will be swung bodily around the cutter until the pointer toe 20 indicates on arc 19 the bevel angle designated on the template for that particular location. In the illustration of Figure 1 this angle would be slightly under 92 degrees prior to commencement of the cut shown. Movement of the work sheet and template toward the cutter is then continued until the edge of the template firmly engages locator 14.

The start of the standing bevel cut to be made on the work plate is thus established, and the work profile is machined by moving the template edgewise past locator 14, so that the cutter will cut a groove in the work sheet W as shown in Figure 1. As the template is thus translated past the locator it will also be swung bodily around the cutter simultaneously so that arm 2 will be swung to move pointer 20 along the arc 19, always opposite the number indicated on the template at progressive locations.

From the initial point of the cut in the instance selected the work plate and template will first be swung bodily in a clockwise direction, arm 2 also swinging clockwise, as the cutting progresses to increase the standing bevel until, when the cut has reached the location designated 94 on the template, the toe 20 will point to the number 94 on arc 19. The work will thereafter progressively be swung bodily counterclockwise, to swing arm 2 correspondingly through the position shown in Fig. 1 until toe 20 points at number 92 on arc 19, for decreasing the standing bevel. The template and work will then merely be rotated at this location to translate the template edge past the locator 14 without bodily swinging displacement around the cutter until the next number 92 on the template is reached. During this interval the pointer 20 will pause at the number 92 on the arc 19. Thereafter the work and template will again be swung bodily counterclockwise as they are rotated so that the standing bevel will be decreased progressively until the edge cut is perpendicular at the location designated 90 on the template. As the cut is completed from that point the template and work plate will continue to be swung bodily in a counterclockwise direction while an under bevel of increasing magnitude, finally reaching 88°, will be cut.

It will be realized, of course, that the operation described is only illustrative, my indicator being useful in machining either a standing or an under bevel of uniform slope, as well as while cutting a perpendicular edge, with a router having a tilted cutter. It is unnecessary to change the angle of the cutter for machining a uniform bevel of lesser degree than the cutter inclination, for such operation may be performed merely by moving the work so that pointer 20 on arm 2 will remain stationary at the location on arc 19 indicating the degree of standing bevel or under bevel desired.

Furthermore, while I have described the application of my indicator to a machine in which the work is moved while the cutter is not displaced, it might equally well be applied to a machine where the work is held stationary and the cutter is shifted around the work and template. The protractor arc 19 could be located definitely relative to the cutter as described above, such as by being mounted on the cutter carrier to be swung with the cutter relative to the arm 2 and pointer 20 as the cutter angle is changed relative to the work. In such an installation, therefore, the relationship and operation of all parts of the indicating mechanism may be exactly as described above, although the size, form and location of the component elements might be changed somewhat as a matter of convenience.

I claim as my invention:

1. A bevel angle indicator for a router having a side milling cutter tilted relative to a work supporting table, comprising locating means in definite relationship to the cutter and engageable with a template fixed relative to a work plate on the work supporting table, to guide relative movement of the work plate and the cutter circumferentially of the template, and means associated with said locating means, engageable with the template when it is in contact with said locating means, and operable by the relative disposition of the template and the cutter circumferentially of the cutter to indicate the angle at which the cutter is cutting the edge of the work plate.

2. A bevel angle indicator for a router having a side milling cutter tilted relative to a work supporting table, comprising locating means disposed substantially directly above the cutter and engageable with a template mounted on the upper surface of a work plate on the work supporting table, to guide relative movement of the work plate and the cutter circumferentially of the template, and means supported above the cutter and alongside said locating means, engageable with the template when it is in contact with said locating means, and operable by the relative disposition of the template and the cutter circumferentially of the cutter to indicate the angle at which the cutter is cutting the edge of the work plate.

3. A bevel angle indicator for a router having a side milling cutter projecting upwardly through an aperture in a work supporting table in tilted relationship thereto, comprising locating means fixed substantially directly above the cutter and engageable with a template mounted on the upper surface of a work plate slidable upon the work supporting table, to guide rotation of the work plate as the cutter progresses circumferentially around the template, and means supported above the cutter alongside said locating means, engageable with the template when it is in contact with said locating means, and movable by bodily swinging of the template around the cutter to indicate changes in the angle at which the cutter is cutting the edge of the work plate.

4. A bevel angle indicator for a router having a side milling cutter tilted relative to a work supporting table, comprising locating means in definite relationship to the cutter and engageable with a template fixed relative to a work plate on the work supporting table, to guide relative movement of the work plate and the cutter circumferentially of the template, contact means associated with said locating means, engageable with the template when it is in contact with said locating means, and means fixed relative to the cutter and cooperating with said contact means to be moved relatively by relative shifting of the template and cutter circumferentially of the cutter, to indicate changes in the angle at which the cutter is cutting the edge of the work plate.

5. A bevel angle indicator for a router having a side milling cutter tilted relative to a work supporting table, comprising a locator fixed relative to the cutter and engageable with a template fixed relative to a work plate on the work supporting table, to guide relative movement of the work plate and the cutter circumferentially of the template, a contact element swingable about said locator by contact with the template when it is engaged with said locator, and indicator means operatively connected to said contact element and movable by swinging of said contact element about said locator, to indicate changes in the angle at which the cutter is cutting the edge of the work plate by relative displacement of the template and the cutter circumferentially of the cutter.

6. A bevel angle indicator for a router having a side milling cutter projecting upwardly through an aperture in a work supporting table in tilted relationship thereto, comprising a locator fixed substantially directly above the cutter and engageable with a template mounted on the upper surface of a work plate slidable upon the work supporting table, to guide rotation of the work plate as the cutter progresses circumferentially around the template, a contact element swingable about said locator by contact with the template when it is engaged with said locator, means operable to maintain said contact element in engagement with the template as it is swung bodily in either direction around said locator, and indicating means operatively connected to said contact element and rotatable by swinging thereof about said locator to indicate changes in the angle at which the cutter is cutting the edge of the work plate by displacement of the template circumferentially of the cutter.

7. A bevel angle indicator for a router having a side milling cutter tilted relative to a work supporting table, comprising a locator mounted at one end of the cutter and engageable with a template secured upon a work plate on the work supporting table, to guide relative movement of the work plate and the cutter circumferentially of the template, a pointer, means interengageable between said pointer and the template when engaged with said locator, operable to move said pointer by relative displacement of the template and the cutter circumferentially of the cutter, and an angle index coordinated with the cutter and cooperating with said pointer to indicate the angle at which the cutter is cutting the edge of the work plate by the relative disposition of the template and the cutter circumferentially of the cutter.

8. A bevel angle indicator for a router having a side milling cutter projecting upwardly through an aperture in a work supporting table in tilted relationship thereto, comprising a locator fixed substantially directly above the cutter and engageable with a template mounted on the upper surface of a work plate slidable upon the work supporting table, to guide rotation of the work plate as the cutter progresses circumferentially around the template, a contact element swingable about said locator by contact with the template when it is engaged with said locator, a pointer rotatable about said locator, means interengageable between said contact element and said pointer to rotate said pointer by swinging of said contact element about said locator resulting from bodily swinging of the template about the cutter, and a protractor arc on the work supporting table disposed concentrically of said locator and cooperating with said pointer to indicate the angle at which the cutter is cutting the edge of the work plate by the disposition of the template circumferentially of the cutter.

9. A bevel angle indicator for a router having a side milling cutter tilted relative to a work supporting table, comprising a circular locator mounted at one end of the cutter and engageable with a template fixed relative to a work plate on the work supporting table, to guide relative movement of the work plate and the cutter circumferentially of the template, an arm supported for rotation about said locator, a pair of legs straddling said locator and having corresponding ends pivoted upon said arm, means interconnecting said arm and said legs to maintain said legs spaced equidistantly from said locator, and a protractor arc cooperating with the swinging end of said arm to indicate the angle at which the cutter is cutting the edge of the work plate.

10. A bevel angle indicator for a router having a side milling cutter tilted relative to a work supporting table, comprising a circular locator mounted at one end of the cutter and engageable with a template fixed relative to a work plate on the work supporting table, to guide relative movement of the work plate and the cutter circumferentially of the template, an arm supported for rotation about said locator, a pair of legs straddling said locator and having corresponding ends pivoted upon said arm, two links each having one end connected to a leg of said pair, a common pivot interconnecting the other ends of said links, means guiding said common pivot for movement lengthwise of said arm, spring means operable to press said legs toward said locator, and a protractor arc cooperating with the swinging end of said arm to indicate the angle at which the cutter is cutting the edge of the work plate.

ELZA L. REED.